(12) United States Patent
Flores (10) Patent No.: US 7,707,840 B1
(45) Date of Patent: May 4, 2010

(54) PORTABLE AIR-CONDITIONING UNIT (76) Inventor: Mark A. Flores, 2002 Turnberry Dr., Oxnard, CA (US) 93036

(*) Notice: Subject to any disclaimer, the term of this patent is extended or adjusted under 35 U.S.C. 154(b) by 507 days.

(21) Appl. No.: 11/518,632

(22) Filed: Sep. 11, 2006

(51) Int. Cl.
F25B 15/16 (2006.01)
F25B 15/00 (2006.01)
F28D 5/00 (2006.01)

(52) U.S. Cl. ............... 62/109; 62/101; 62/304
(58) Field of Classification Search .......... 62/3.6, 62/259.3, 262, 285, 304, 420, 421, 444; 5/423; 55/385.2; 128/400; 135/16
See application file for complete search history.

(56) References Cited

U.S. PATENT DOCUMENTS

| | | | |
|---|---|---|---|
| 2,235,966 A | 3/1941 | Summers | |
| 2,637,048 A * | 5/1953 | William et al. | 5/413 R |
| 3,840,923 A | 10/1974 | Bos | |
| 3,916,911 A * | 11/1975 | Sauder et al. | 607/104 |
| 4,151,658 A | 5/1979 | Hibino et al. | |
| 4,660,388 A | 4/1987 | Greene | |
| 4,841,742 A * | 6/1989 | Biby | 62/420 |
| 4,939,804 A | 7/1990 | Grant | |
| 5,030,495 A | 7/1991 | Neu | |
| 5,125,238 A | 6/1992 | Ragan | |
| 5,165,400 A | 11/1992 | Berke | |
| 5,596,778 A | 1/1997 | Suzuki et al. | |
| 5,655,237 A | 8/1997 | Suzuki et al. | |
| 5,683,441 A | 11/1997 | Dickerhoff et al. | |
| 5,730,120 A | 3/1998 | Yonkers | |
| 5,733,320 A | 3/1998 | Augustine | |
| 6,363,551 B1 * | 4/2002 | Flores | 5/423 |
| 6,418,728 B1 * | 7/2002 | Monroe | 62/3.2 |
| 6,473,920 B2 | 11/2002 | Augustine et al. | |
| 6,508,850 B1 * | 1/2003 | Kotliar | 55/385.2 |
| 6,592,049 B1 * | 7/2003 | Wolput | 239/70 |
| 6,901,769 B2 * | 6/2005 | Blackstone | 62/420 |
| 2002/0078985 A1 * | 6/2002 | Farr | 135/16 |
| 2005/0077391 A1 * | 4/2005 | Powell et al. | 239/373 |

* cited by examiner

Primary Examiner—Frantz F Jules
Assistant Examiner—Emmanuel Duke
(74) Attorney, Agent, or Firm—Alberta O. Cota (57) ABSTRACT A portable air conditioning unit (10) that is designed to produce cooled air without the need for a cooling refrigerant. The unit (10) includes an enclosure (12) that houses an air duct (40) having an air input port (42) attached to a fan (48) that is powered by a rechargeable battery pack (34), and an air exhaust vent (36) that protrudes through an air exhaust opening located on a first panel (24) located on the enclosure (12). The air exhaust vent (36) passes the cooled air through a flexible air passage hose (90) having an air output connector (96) that is attached to a structure air input port (102) located on a cooled-air receiving structure (100). The structure (100) can consist of various structures which include a bed sheet (140), a sleeping bag (148), a tent (178), a field suit (204) or a flexible non-porous drape (230) that is dimensioned to be draped over the back of an animal (304) such as a horse.

3 Claims, 10 Drawing Sheets

PORTABLE AIR-CONDITIONING UNIT

TECHNICAL FIELD

The invention generally pertains to the field of air conditioners, and more particularly to a portable air-conditioning unit that requires no cooling refrigerants and that can be connected to various designs for a cooled-air receiving structure.

BACKGROUND ART

The quantity and quality of sleep and the comfort provided when performing various daily activities is directly related to the quality and the temperature of the ambient air to which a person is exposed. On hot summer days it is especially difficult or at best uncomfortable to sleep or to perform many activities.

The use of home or vehicle air conditioners solves some of the above problems as long as a person remains in the home or inside the vehicle. However, the problem of maintaining a comfortable and healthy air temperature remains when the person leaves the confines of the home and/or the vehicle.

A search of the prior art did not disclose any literature or patents that read directly on the instant invention. However, the following U.S. patents are considered related:

| U.S. PAT. NO. | INVENTOR | ISSUED |
| --- | --- | --- |
| 6,363,551 | Flores | 2 Apr. 2002 |
| 5,733,320 | Augustine | 31 Mar. 1998 |
| 5,730,120 | Yonkers | 24 Mar. 1998 |
| 5,683,441 | Dickerhoff, et al | 4 Nov. 1997 |
| 5,655,237 | Suzuki, et al | 12 Aug. 1997 |
| 4,660,388 | Greene | 28 Apr. 1987 |

The U.S. Pat. No. 6,363,551 discloses an air-flow containment and distribution assembly consisting of a bed sheet, an air duct and an electric fan. The bed sheet includes at least one air-duct opening located near an edge of the sheet, and the air duct includes a closed front section and an open rear end. The duct's front section has a bulbous shape and an opening that is dimensioned to be attached to the air-duct opening and the rear end forms a shroud that attaches to the fan. When the bed sheet is placed over a bed mattress, the air from the fan flows through the air duct and under the sheet to maintain a person or persons under the bed sheet at a selectable air flow and temperature. Note that the inventor of the U.S. Pat. No. 6,363,551 is also the applicant of the instant application.

The U.S. Pat. No. 5,733,320 discloses an electrically operated source that provides a stream of thermally-controlled inflating medium to inflate an inflatable thermal care apparatus. The apparatus is used for treating a hospital patient while employing active noise cancellation to reduce noise created by the source. Thus providing a reduced noise treatment device for treating hypothermic patients.

The U.S. Pat. No. 5,730,120 discloses a bed ventilator, which includes an electric axial flow fan for moving air between a mattress and a bed cover thereon. The fan and a duct are mounted on a flat support tongue that is sandwiched between the mattress and its supporting bed structure such as a box spring. The duct includes telescopic duct sections that can be adjusted to accommodate mattresses of different thickness. Locking screws are provided for securing a selected telescopic relation between the duct sections for a particular mattress involved.

The U.S. Pat. No. 5,683,441 discloses a blanket for use with forced air convection systems. The blanket includes an airflow deflector internal to the blanket and located near the blanket's air inlet port. By providing a blanket with an airflow deflector, better distribution of air within the confines of the blanket may be achieved, which helps to reduce and eliminate problems associated with hot and cold spots within the blanket.

The U.S. Pat. No. 5,655,237 discloses a comforter in which a front cloth and a rear cloth are joined together at their peripheral edges to form a bag that is filled with a heat insulating material such as feather, wool and cotton. An air-permeable cloth is joined with the rear cloth to define an air passage ranging from hem to center part of the comforter. The air passage is opened at the hem of the comforter, where an air opening is provided for feeding warm or cool air. The warm or cool air fed through the opening to the air passage and is passed through the sleeping space and the interior of the comforter.

The U.S. Pat. No. 4,660,388 discloses a cooling cover having an air inflatable pad, which is positioned within a pocket of a coverlet. The pad is formed of air impermeable material and has plenum chambers at opposite ends thereof, and a plurality of individual longitudinally extending passages which extend between the plenum chambers. Air orifices of a non-uniform pattern located in the lower surfaces of the inflatable pad, direct cooling air in a plurality of small air jets onto the body of a user of the cooling cover. A source of cool air is connected to an inlet to deliver cool air to the pad.

For background purposes and as indicative of the art to which the invention relates, reference may be made to the following remaining patents found in the search:

| U.S. PAT. NO. | INVENTOR | ISSUED |
| --- | --- | --- |
| 6,473,920 | Augustine, et al | 5 Nov. 2002 |
| 5,596,778 | Suzuki, et al | 28 Jan. 1997 |
| 5,165,400 | Berke | 24 Nov. 1992 |
| 5,125,238 | Ragan | 30 Jun. 1992 |
| 5,030,495 | Neu | 9 Jul. 1991 |
| 4,939,804 | Grant | 10 Jul. 1990 |
| 4,151,658 | Hibino, et al | 1 May 1979 |
| 3,840,923 | Bos | 15 Oct. 1974 |
| 2,235,966 | Summers | 25 Mar. 1941 |

DISCLOSURE OF THE INVENTION

The portable air-conditioning unit described herein, is designed to produce cooled air without the need for the unit requiring a refrigerant. In its basic design configuration, the unit is comprised of:

1. An enclosure having means for housing an air duct that includes an air inlet port and an exhaust port. The air inlet port has attached a fan that is powered by a rechargeable power pack and the air exhaust port is connected to an air exhaust vent protruding from the enclosure.

2. A cooled-air receiving structure having a structure air input port. The structure can be selected from a group of structures consisting of a bed cover, a sleeping bag, a tent, a field suit and a flexible non-porous drape.

3. A flexible air passage hose having an air input connector that is attached to the air exhaust vent, and an air output connector that is attached to the structure air input port. When the fan is operating, cooled air flows sequentially through the air duct, the air exhaust port, the air exhaust vent, the air input connector, the air output connector and into the structure air input port where the cooled air is distributed throughout the cooled-air receiving structure.

The enclosure can be constructed of a plurality of panels that are each attached by an attachment means such as screws. Preferably however, a frame assembly is used that includes means for releasably attaching the plurality of panels. The panel attaching means can be selected from the group consisting of a set of hook and loop fasteners, complimentary snaps, screws and bolts.

To improve the quality of the air supplied to the cooled air receiving structure, at least one input air filter can be located adjacent the structure's rear panel, and a set of output air filters can be located at the air exhaust port. Also to increase the temperature of the cooled air, a water misting assembly can be utilized. The assembly includes a hose that is attached around the inner perimeter of the enclosure's upper panel. The hose is supplied water from a water container that is attached to an enclosure panel and that is operated by a water pump powered by the rechargeable battery pack. The hose has a multiplicity of water jets that are optimally located to provide a water mist that impinges upon the outer surface of the air duct. The assembly can also be designed to include a timer that allows the duration of the application of the water mist to be selectively set.

In view of the above disclosure, it is the primary object of the invention to produce a portable air-conditioning unit that requires no refrigerant to produce cooled air and that can be attached to various cooled-air receiving structures.

In addition to the preferred embodiment it is also an object of the invention to produce a portable air-conditioning unit that:

can be produced in various sizes and light-weight materials, provide relief on hot summer nights, can be used in combination with aroma therapy, provides relief to individuals with sunburned skin or those who have skin irritations, rashes, fevers and night sweats, is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for a portable air-conditioning unit 10 that does not require a refrigerant media to produce a cooled air flow. The basic design of the unit 10 is disclosed in the applicant's issued U.S. Pat. No. 6,363,551 entitled "AIR-FLOW CONTAINMENT AND DISTRIBUTION ASSEMBLY" which is incorporated herein by reference.

The portable air-conditioning unit 10, as shown in FIGS. 1-16, includes an enclosure 12 that is designed to function as a common unit that can be utilized to cool five cooled-air receiving structures 100. These structures include but are not limited to a flexible cover 130, such as a bed sheet 140, a sleeping bag 148, a tent 178, a field suit 204, and a flexible non-porous drape 230.

The enclosure 12 in the preferred embodiment which can be made of various light weight materials, encloses the following major elements: a battery pack 34, an air duct 40, a fan 48, an input air filter 80, a set of output air filters 84, a water misting assembly 108, and a timer 118.

Figure 1:
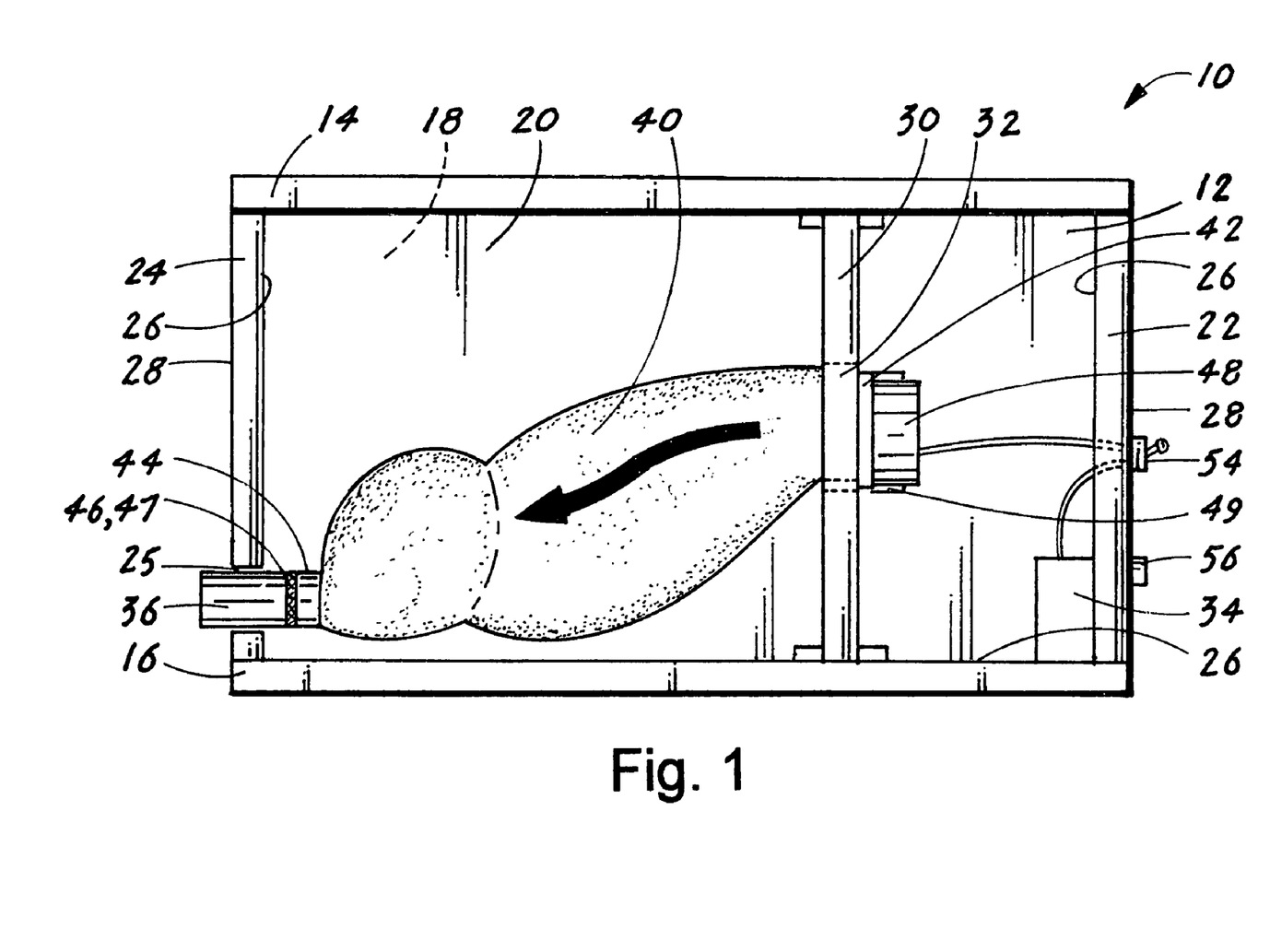
FIG. 1 is a side elevational/cut-away view of an enclosure that houses the basic elements that comprise a portable air-conditioning unit.
Figure 3:
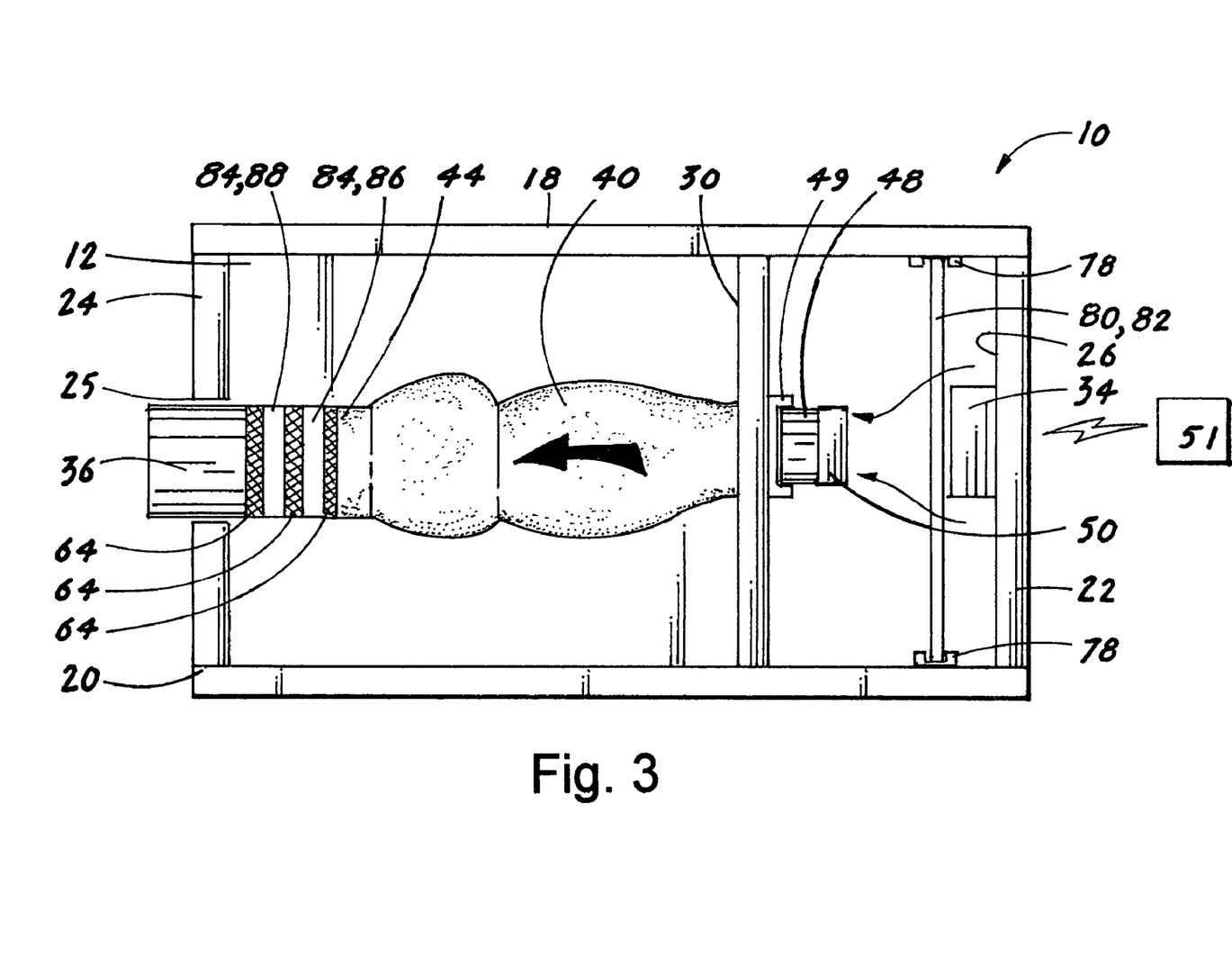
FIG. 3 is a side elevational/cut-away view of an enclosure showing a set of filters that are located at the air input and the air output of the enclosure.
Figure 5:
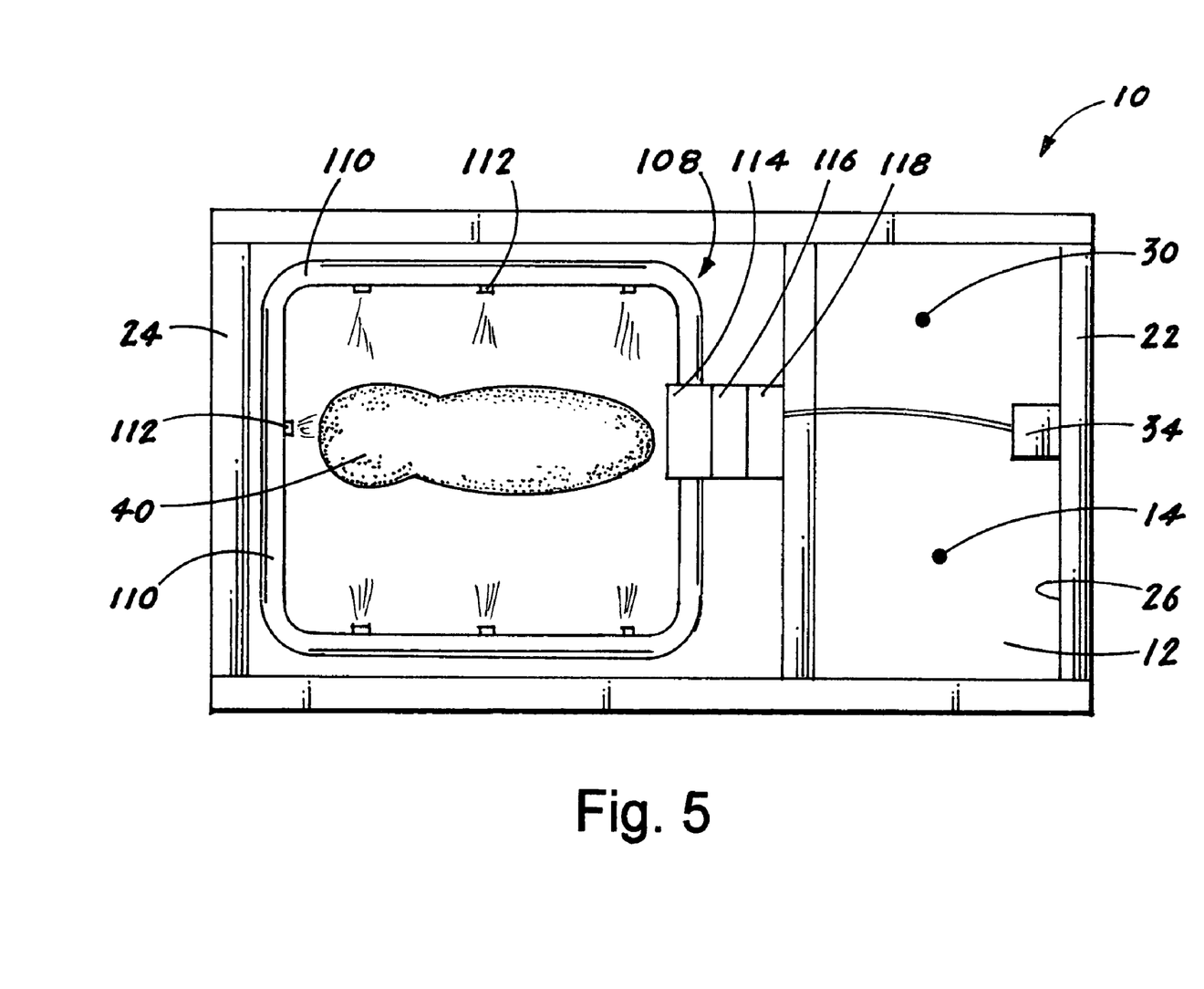
FIG. 5 is a top plan/cut-away view showing a typical installation of a water misting assembly.

The enclosure 12, as best shown in FIGS. 1, 3 and 5, is structurally comprised of an upper panel 14, a lower panel 16, a right panel 18, a left panel 20, a rear panel 22, and a front panel 24. The front panel has an air exhaust opening 25 into which is inserted and attached an air exhaust vent 36, and an inner panel 30, that is attached, as shown in FIG. 1, between the rear panel 22 and the front panel 24 and that has a substantially centered opening 32. Also, each panel with the exception of the inner panel, has an inner surface 26 and an outer surface 28.

Figure 2:
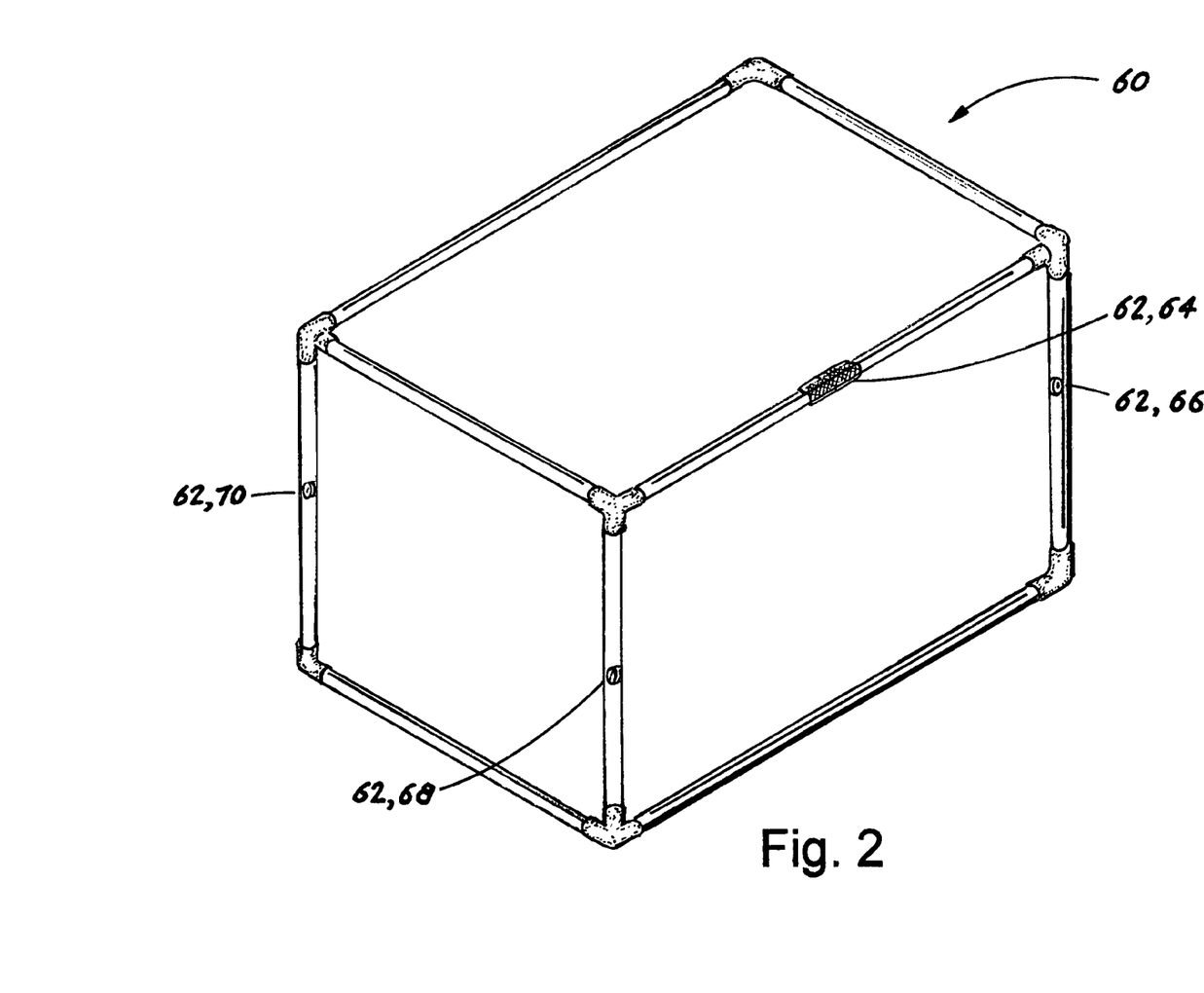
FIG. 2 is a partial perspective view of an optional frame assembly that is used to attach the panels of the enclosure.

The panels can be designed to be attached together by various panel attachment means, however for convenience and maintenance, a frame assembly 60, as shown in FIG. 2, that includes a means for releasably attaching each of the enclosure panels is preferred. The panel releasing means can consist of hook and loop fasteners 64, complimentary snaps 66, screws 68 or bolts 70.

Figure 4:
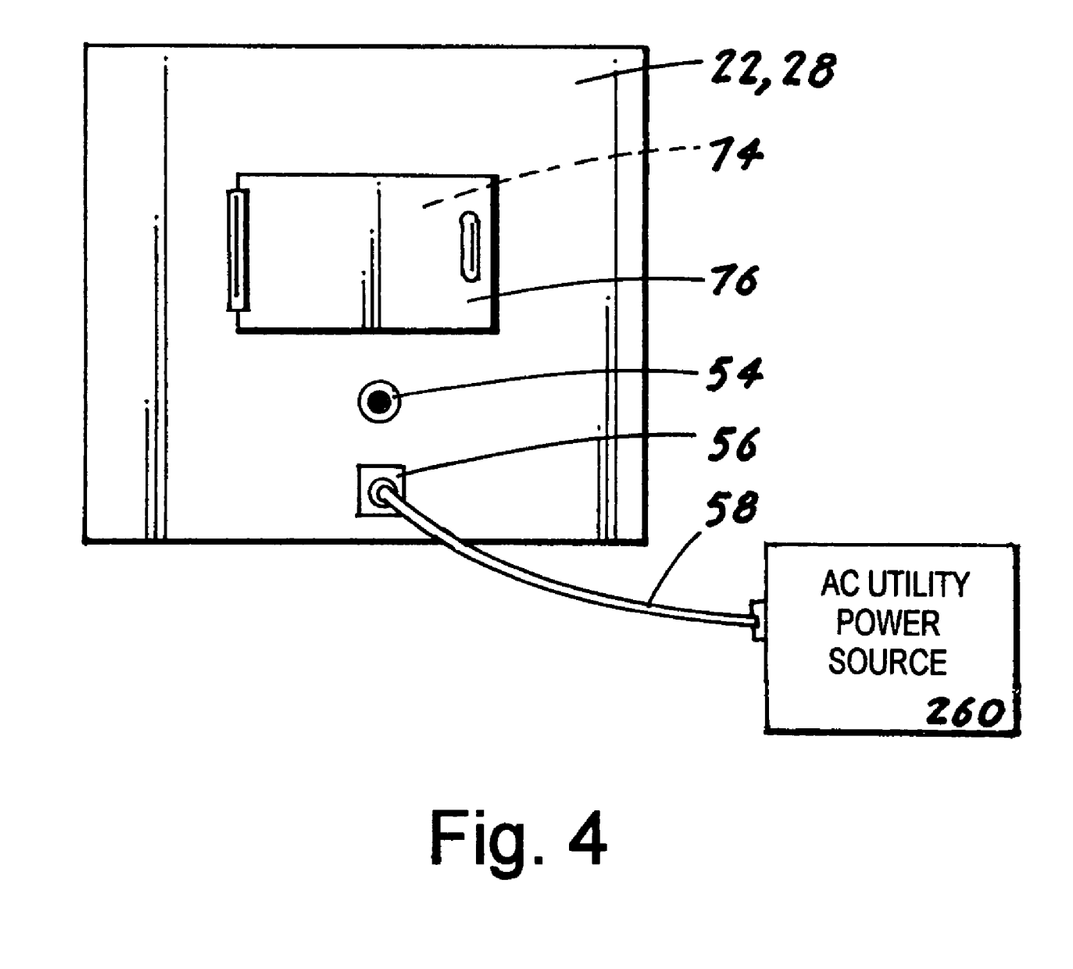
FIG. 4 is an elevational view of the enclosure's rear panel showing a typical placement of a ventilation opening having a hinged door, a power switch and a battery recharging port that connects to an a-c utility power source.

The battery pack 34, as shown in FIG. 1, is attached to the inner surface 26 of the rear panel 22 and is operated by a power switch 54, as shown in FIG. 4, that is accessible from the outer surface 28 of the rear panel 22. As also shown in FIG. 4, the battery pack 34 is connected to a battery recharging port 56 that is connected by a power cable 58 to an a-c utility power source 260. The rear panel 22, as also shown in FIG. 4, includes a ventilation opening 74 having a hinged door 76 attached thereto.

The air duct 40, which is described in detail in the applicant's incorporated U.S. Pat. No. 6,363,551, has an air input port 42 and an air exhaust port 44, as shown in FIGS. 1, 3 and 5. The air exhaust port 44 is attached by an attachment means 46, which preferably consists of hook and loop fasteners 47, to the air exhaust vent 36, and the air input port 42 is dimensioned to extend through the centered opening 32 located on the inner panel 30. Attached by an attachment means to the air input port 42, as shown in FIG. 1, is the fan 48, which in turn is connected to and powered by the battery pack 34. The fan attachment means is preferably comprised of an adjustable fan attachment frame 49, as also shown in FIG. 1. The fan 48, as shown in FIG. 3, can be further comprised of a variable fan speed control unit 50 that is operated by a hand-held remote control device 51.

As shown FIG. 3, the enclosure 12 further comprises on the left and right panels 18,20 adjacent the rear panel 22 a set of slots 78. The slots 78 are dimensioned to accept the input air filter 80, which is preferably comprised of a high efficiency particulate (HEPA) filter 82. The set of output air filters 84, as also shown in FIG. 3, are located and attached by means of hook and loop fasteners 64 between the air exhaust port 44 on the air duct 40 and the air exhaust vent 36 protruding through the air exhaust opening 25 on the front panel 24. The set of output air filters 84 are comprised of at least one ion grid 86 and one ozone guard 88.

To increase the temperature of the cooled air being supplied by the air duct 40, a water misting assembly 108 is used. The assembly 108, as shown in FIG. 5, consists of a hose 110 that is attached around the inner perimeter of the upper panel 14. The hose 110 is supplied water from a water container 114 that is attached to one of the enclosure panels and that is operated by a water pump 116, which is powered by the battery pack 34. The hose 110 has a plurality of water jets 112 that are optimally located to provide a water mist that impinges upon the outer surface of the air duct 40. The water misting assembly 108 can also be designed to include a timer 118 that is connected between the water pump 116 and the battery pack 34. The timer 118 allows the duration of the application of the water mist to be selectively set.

Figure 6:
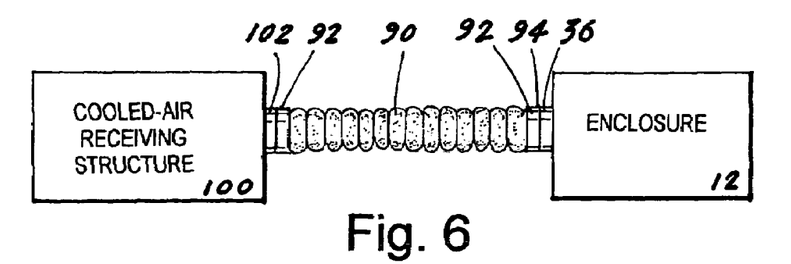
FIG. 6 is a side elevational view showing an enclosure attached by means of a flexible air hose to a cooled air receiving structure.

The interface between the enclosure 12 and cooled-air receiving structure 100 is provided by a flexible air passage hose 90, as shown in FIG. 6. The hose 90 has an air input connector 92 and an air output connector 96. The air input connector 92 is attached by an attachment means to the air exhaust vent 36 protruding from the front panel 24 of the enclosure 12, and the air output connector 96 is attached to the structure air input port 102 located on the cooled-air receiving structure 100.

A description of each of the five cooled-air receiving structures follows.

Figure 7:
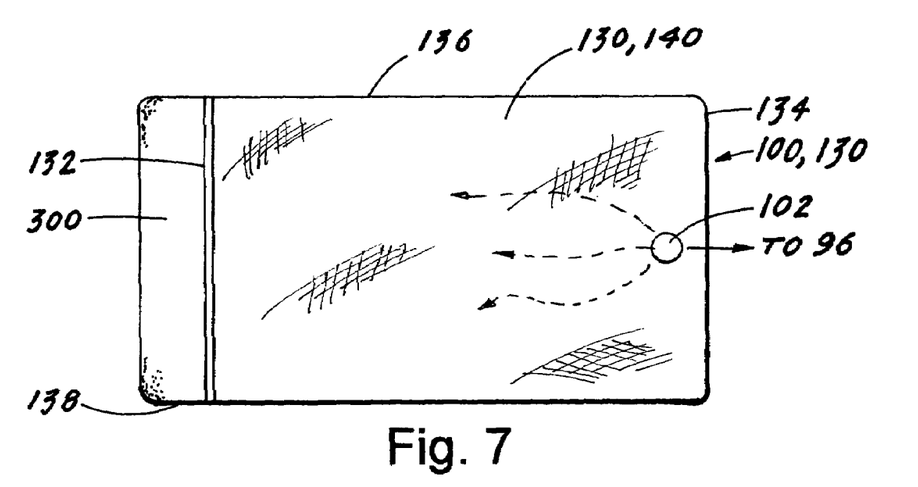
FIG. 7 is a top plan view of a cooled air receiving structure consisting of a bed cover that is placed over a bed and mattress.
Figure 8:
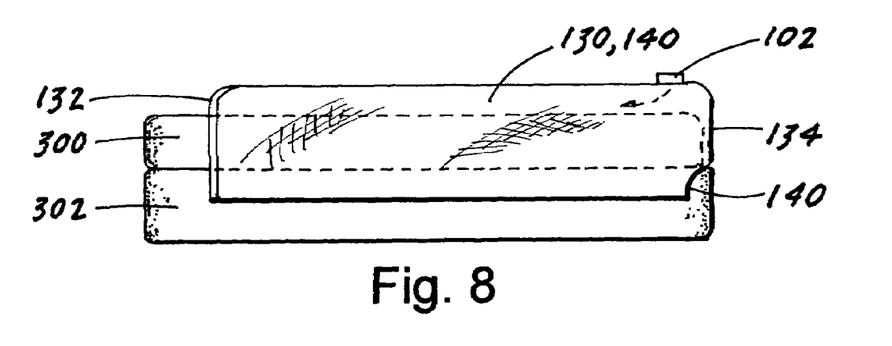
FIG. 8 is a side elevational view of the bed cover shown in FIG. 7.

The first cooled-air receiving structure 100 disclosed, as shown in FIGS. 7 and 8, is comprised of a flexible cover 130 that is dimensioned to be placed over a substantially flat area and that has a front edge 132, a rear edge 134, a right edge 136 and a left edge 138. At least one structure air input port 102 is located adjacent the rear edge 134 of the cover 130 and attaches to the air output connector 96 located on the flexible air passage hose 90. The air input connector 92 on the hose 90 is attached to the air exhaust vent 36 on the enclosure 12. When the portable air-conditioning unit 10 is operating, a stream of cooled air is supplied through the hose 90 into the cover 130.

The substantially flat area is comprised of a bed 300 and mattress 302 combination and the flexible cover 130 is comprised of a bed sheet 140. The bed sheet 140 is dimensioned to allow the rear edge 134 of the bed sheet 140 to be tucked under the bed 300, with the right and left edges 136,138 of the bed sheet 140 draped over the sides of the bed 300. When the portable air-conditioning unit 10 is operating, a stream of cooled air is applied under the bed sheet 140 to maintain a person or persons lying on the bed at a cool temperature.

Figure 9:
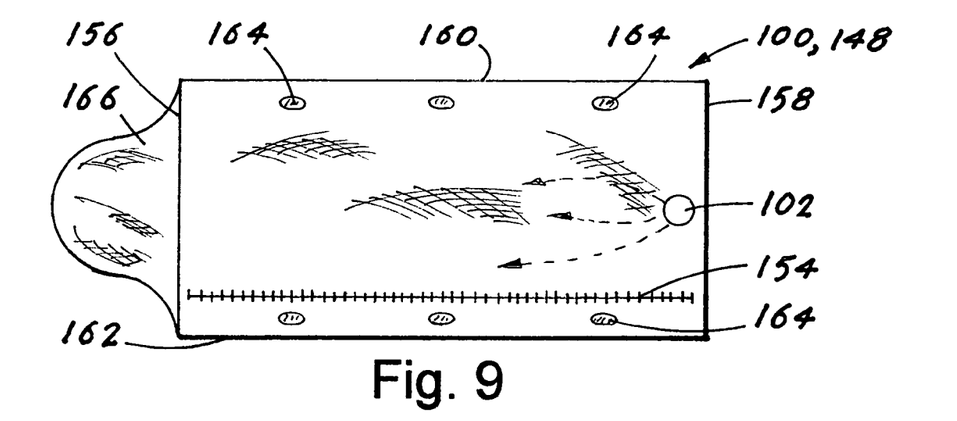
FIG. 9 is a top plan view of a cooled-air receiving structure consisting of a sleeping bag.
Figure 10:
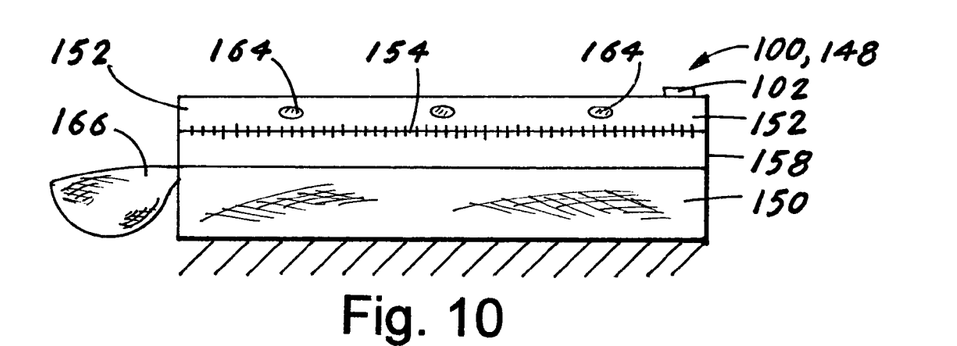
FIG. 10 is a side elevational view of the sleeping bag shown in FIG. 9.
Figure 11:
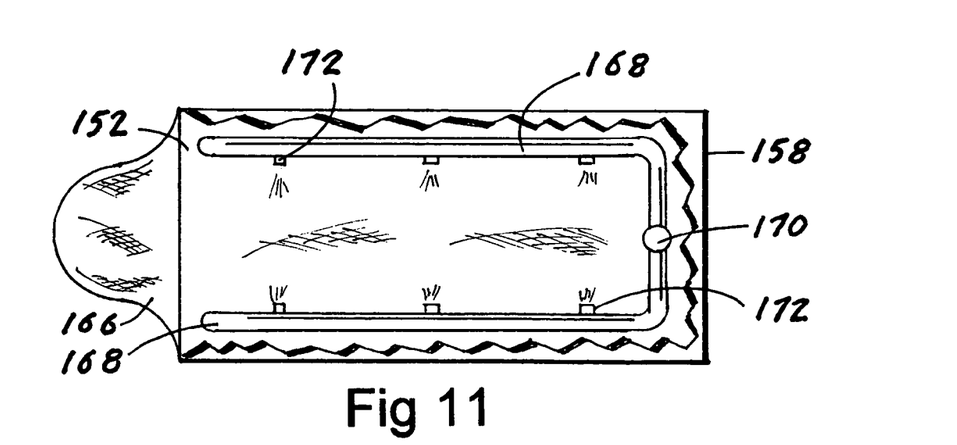
FIG. 11 is a top plan/cut-away view of sleeping bag that utilizes an air passage conduit to distribute the air over the surface of the sleeping bag.

The second cooled-air receiving structure 100 is comprised of a sleeping bag 148, as shown in FIGS. 9, 10 and 11, which includes a lower section 150 and an upper section 152. The lower section 150 is typically placed on a solid surface, and the upper section 152 is removably attached by a zipper 154 or the like to the lower section 150 and includes a front edge 156, a rear edge 158, a right edge 160 and a left edge 162. A plurality of adjustable air vents 164 are located adjacent the right edge 160 and the left edge 162, and attached between the lower and upper sections 150,152 is a head enclosure 166.

At least one structure air input port 102, as shown in FIGS. 9 and 10, is located adjacent the rear edge 158 of the upper section 148. The port 102 is attached to the air output connector 96 located on the flexible air passage hose 90. When the air input connector 92 on the hose 90 is attached to the air exhaust vent 36 on the enclosure 12, and the portable air-conditioning unit 10 is operating, a stream of cooled air is applied through the hose 90 into the sleeping bag 148.

As shown in FIG. 11, the sleeping bag 148 can be designed to include an air passage conduit 168 that extends internally along the right and left edges 136,138 and that has a plurality of air jets 172. The conduit has an air input port 170 that is attached to the structure air input port 102 located adjacent the rear edge 158 of the upper section 152. When the portable air-conditioning unit 10 is attached and operated, the cooled air from the enclosure 12 passes through the structure air input port 102 and exits through each plurality of air jets 172 to provide distributed cooled air to a person located within the sleeping bag 148.

Figure 12:
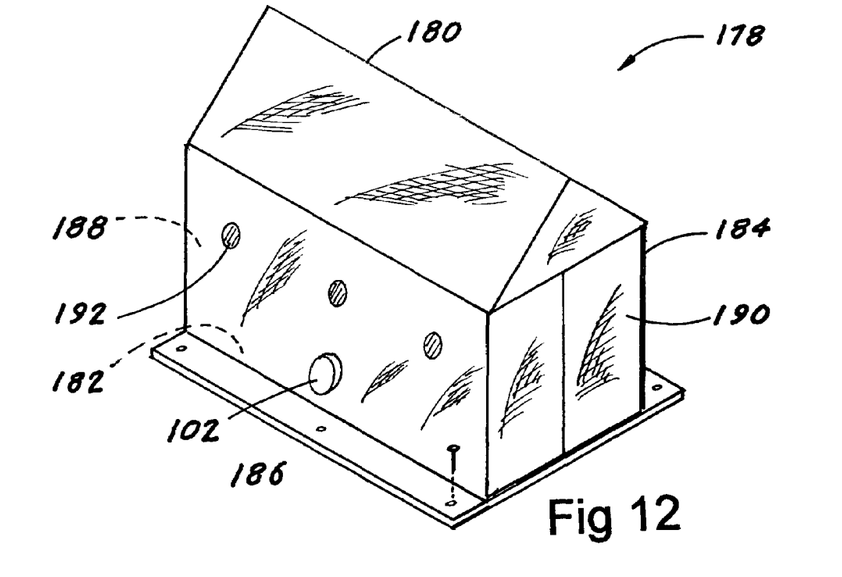
FIG. 12 is a perspective view of a cooled-air receiving structure consisting of a typical tent that is connected to a portable air-conditioning unit.
Figure 13:
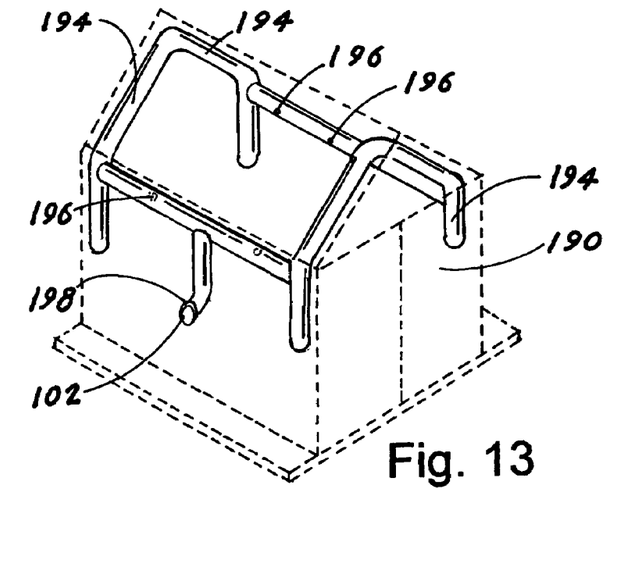
FIG. 13 is a perspective view of a tent that utilizes an air passage conduit to distribute the air over the interior of the tent.

The third cooled-air receiving structure 100, as shown in FIGS. 12 and 13, is comprised of a tent 148 that can consist of a pup tent, a wall tent, a wagon tent, a one person tent, a dome tent and a pop-up tent.

For purposes of the disclosure, a typical tent 178 is shown in FIGS. 12 and 13. The typical tent 178 includes a folded upper panel 180, a lower panel 182, a right panel 184, a left panel 186, a rear panel 188 and a vertically split front panel 190.

On at least one of the panels, as shown in FIG. 12, is located a plurality of adjustable air vents 192 that can be adjusted to control the air being distributed inside the tent 178. Also located on one of the tent panels is at least one structure air input port 102 that attaches to the air output connector 96 located on the flexible air passage hose 90. The air input connector 92 on the hose 90 is attached to the air exhaust vent 36 located on the enclosure 12. When the portable air-conditioning unit 10 is operating, a stream of cooled air is applied from the enclosure 12, through the hose 90, and into the tent 178.

The tent 178 can be designed to further comprise an air passage conduit 194, as shown in FIG. 13, that has a plurality of air jets 196. The conduit 194 is dimensioned to conform to the shape of a specific tent 178 and includes an air inlet port 198 that is attached to the structure air input port 102. When the unit 10 is attached and operational, the cooled air from the enclosure 12 passes through the port 102 and exits through each of the plurality of air jets 196 to provide distributed cooled air to a person or persons located within the tent 178.

Figures 14, 15:
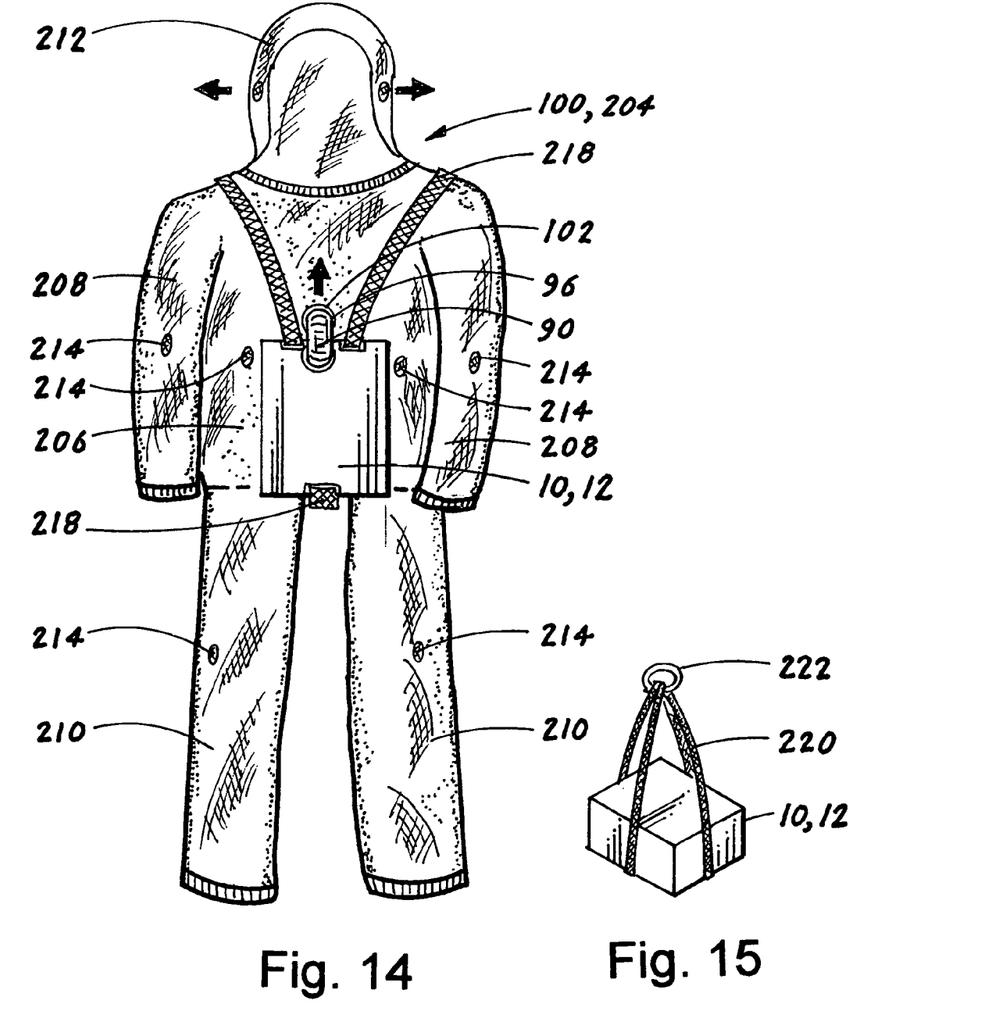
FIG. 14 is a front elevational view of a cooled-air receiving structure consisting of a field suit that has attached to its chest area an enclosure that is attached by means of a harness assembly.
FIG. 15 is a perspective view of an enclosure that is located within an externally located, hand-carried cradle assembly.

The fourth cooled-air receiving structure 100, as shown in FIGS. 14 and 15, is comprised of a field suit 204 that includes a torso section 206, a pair of arms 208, a pair of legs 210 and an integrated head enclosure 212. On selected sections of the field suit 204 are located a plurality of adjustable air vents 214, as shown in FIG. 12:

On either the front or the rear of the torso section 206 is located a structure air input port 102 that is attached to the air output connector 96 on the flexible air passage hose 90. The air input connector 92 on the hose 90 is attached to the air exhaust vent 36 on the enclosure 12. When the portable air-conditioning unit 10 is operating, a stream of cooled air is applied from the enclosure 12, through the hose 90, and distributed through the field suit 204.

As shown in FIG. 14, the field suit 204 can include a harness assembly 218 that is designed to fit over the field suit 204 and that includes means for attaching the enclosure 12. Alternatively, as shown in FIG. 15, a separate cradle assembly 220 can be employed that is designed to encompass the enclosure 12. The cradle assembly 220 includes a handle 222 that allows a person wearing the field suit 204 to carry the cradle assembly 220 while the person wearing the suit 204 is moving.

Figure 16:
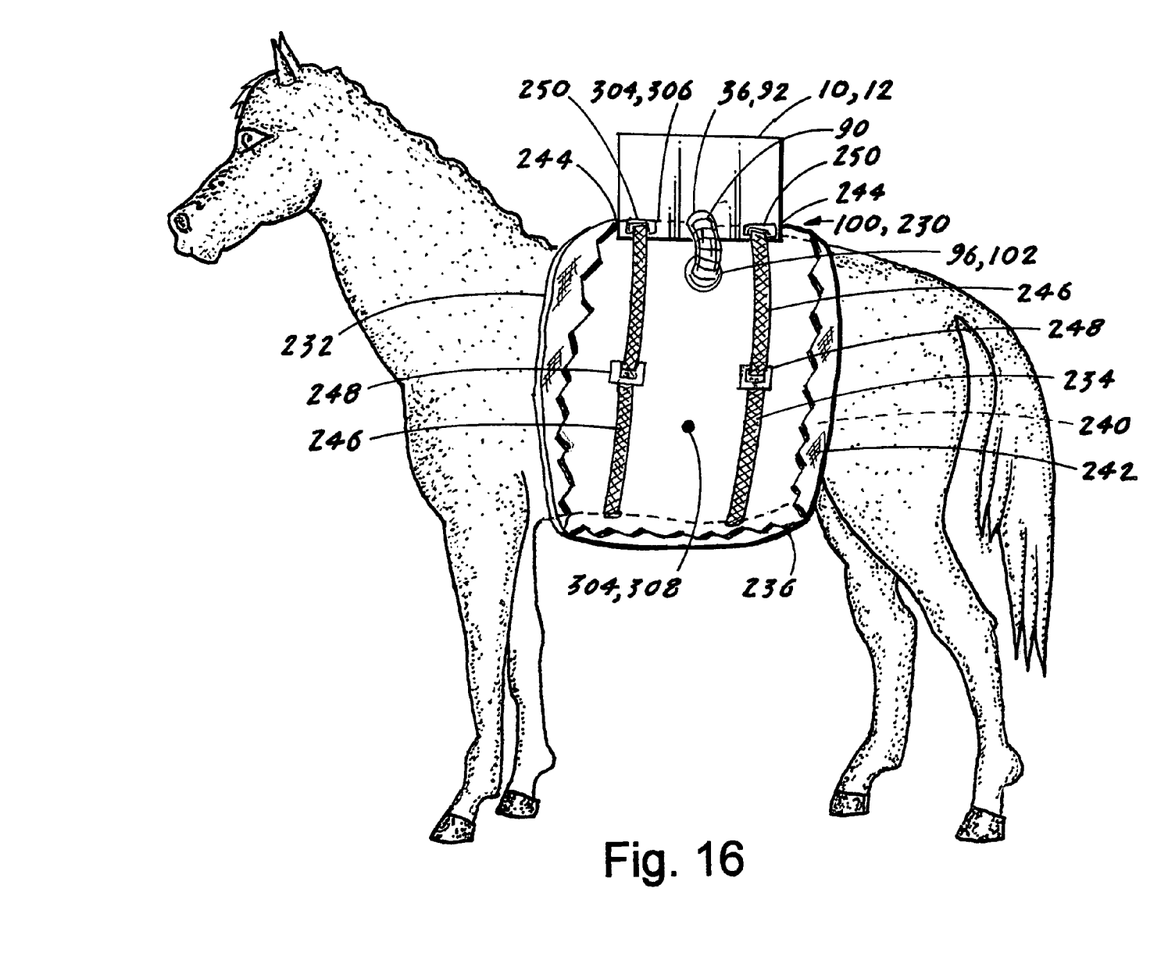
FIG. 16 is a side elevational view of a horse that has attached an enclosure that provides cooled air into a cooled-air receiving structure consisting of a flexible non-porous drape.

The fifth and final cooled-air receiving structure 100 is comprised of a flexible non-porous drape 230 that is draped over an animal 304, such as a horse that has a back 306 and a flank 308, as shown in FIG. 16. The drape 230 is comprised of a front edge 232, a rear edge 234, a lower edge 236, an inner surface 240, and an outer surface 242 having a central slit 244 and a structure air input port 102.

The enclosure 12 is attached to the back 306 of the animal 304 by an attachment means that preferably consists of a set of straps 246 that include a set of strap length adjusting buckles 248. To utilize the straps 246, the enclosure 12 is designed to include a set of strap openings 250 that are located adjacent the lower edge of the right panel 18 and the left panel 20. The straps 246 are inserted through the respective strap openings 250 and placed around the animal's back 306 and flank 308, as also shown in FIG. 16. When the straps 246 are tightened by the strap length adjusting buckles 248, the enclosure 12 is secured to the animal's back 306.

To secure the drape 230, the central slit 244 on the drape 20 is inserted over the enclosure 12 to allow the drape 230 to hang over the animal's back 306 and flank 308. When the air input connector 92 on the flexible air passage hose 90 is attached to the air exhaust vent 36 on the enclosure 12, the hose's air output connector 96 is attached to the structure air input port 102, and the enclosure 12 is operating, a stream of cooled air is applied and distributed across the inner surface 240 of the drape 230.

While the invention has been described in detail and pictorially shown in the accompanying drawings it is not to be limited to such details, since many changes and modifications may be made to the invention without departing from the spirit and the scope thereof. Hence, it is described to cover any and all modifications and forms, which may come within the language and scope of the claims.

The invention claimed is:

1. A portable air-conditioning unit comprising:
   a) an enclosure having an upper panel, a lower panel, a right panel, a left panel, a rear panel and a front panel having an air exhaust opening, wherein each panel has an inner surface and an outer surface,
   b) an inner panel attached between the rear panel and the front panel, wherein said inner panel having a substantially centered opening,
   c) a battery pack attached to the inner surface of the rear panel,
   d) an air exhaust vent inserted through the air exhaust opening on the front
   e) an air duct having an air input port and an air exhaust port, wherein the air exhaust port is attached by an attachment means to the air exhaust vent, and wherein the air input port extends through the centered opening on said inner panel,
   f) a fan attached by an attachment means to the air input port of said air input port of said air duct, wherein said fan is connected to and powered by said battery pack, and
   g) means for attaching said enclosure to a cooled-air receiving structure, comprising:
      (1) a tent having a folded upper panel, a lower panel, a right panel, a left panel, a rear panel and a vertically split front panel,
      (2) a plurality of adjustable air vents located on at least one of the panels, and
      (3) at least one structure air input port is located on one of the tent panels and is attached to the air output connector on said flexible air passage hose, wherein the air input connector on said hose is attached to the air exhaust vent on said enclosure, wherein when said portable air-conditioning unit is operating, a stream of cooled air is applied through said hose into said tent, and h) a water misting assembly having a hose that is attached around the inner perimeter of the upper panel, wherein said hose is supplied water from a water container that is attached to an enclosure panel and that is operated by a water pump powered by said battery pack, wherein said hose having a plurality of water jets that are optimally located to provide a water mist that impinges upon the surface of said air duct.

2. A portable air-conditioning unit comprising:
   a) an enclosure having an upper panel, a lower panel, a right panel, a left panel, a rear panel and a front panel having an air exhaust opening, wherein each panel has an inner surface and an outer surface,
   b) an inner panel attached between the rear panel and the front panel, wherein said inner panel having a substantially centered opening,
   c) a battery pack attached to the inner surface of the rear panel,
   d) an air exhaust vent inserted through the air exhaust opening on the front panel,
   e) an air duct having an air input port and an air exhaust port, wherein the air exhaust port is attached by an attachment means to the air exhaust vent, and wherein the air input port extends through the centered opening on said inner panel,
   f) a fan attached by an attachment means to the air input port of said air input port of said air duct, wherein said fan is connected to and powered by said battery pack,
   g) means for attaching said enclosure to a cooled-air receiving structure, comprising:

(1) a field suit having a torso section, a pair of arms, a pair of legs and an integrated head enclosure, (2) a plurality of adjustable air vents placed on selected portion of said suit (3) a structure air input port that is centrally located on either the front or the rear of the torso section of said field suit, and that attaches to the air output connector on said flexible air passage hose, wherein when the air input connector on said hose is attached to the air exhaust vent on said enclosure, and said portable air-conditioning unit is operating, a stream of cooled air is applied and distributed through said field suit, (4) a harness assembly that is designed to fit over the field suit and that has means for attaching said enclosure, and h) a water misting assembly having a hose that is attached around the inner perimeter of the upper panel, wherein said hose is supplied water from a water container that is attached to an enclosure panel and that is operated by a water pump powered by said battery pack, wherein said hose having a plurality of water jets that are optimally located to provide a water mist that impinges upon the surface of said air duct.

3. A portable air-conditioning unit comprising:

a) an enclosure having an upper panel, a lower panel, a right panel, a left panel, a rear panel and a front panel having an air exhaust opening, wherein each panel has an inner surface and an outer surface, b) an inner panel attached between the rear panel and the front panel, wherein said inner panel having a substantially centered opening, c) a battery pack attached to the inner surface of the rear panel, d) an air exhaust vent inserted through the air exhaust opening on the front panel, e) an air duct having an air input port and an air exhaust port, wherein the air exhaust port is attached by an attachment means to the air exhaust vent, and wherein the air input port extends through the centered opening on said inner panel, f) a fan attached by an attachment means to the air input port of said air input port of said air duct, wherein said fan is connected to and powered by said battery pack, g) means for attaching said enclosure to a cooled-air receiving structure, comprising:

(1) a field suit having a torso section, a pair of arms, a pair of legs and an integrated head enclosure, (2) a plurality of adjustable air vents placed on selected portion of said suit, (3) a structure air input port that is centrally located on either the front or the rear of the torso section of said field suit, and that attaches to the air output connector on said flexible air passage hose, wherein when the air input connector on said hose is attached to the air exhaust vent on said enclosure, and said portable air-conditioning unit is operating, a stream of cooled air is applied and distributed through said field suit, (4) a cradle assembly that is designed to encompass said enclosure, wherein said cradle assembly includes a handle that allows a person wearing said field suit to carry the cradle assembly while the person wearing the field suit is moving, and h) a water misting assembly having a hose that is attached around the inner perimeter of the upper panel, wherein said hose is supplied water from a water container that is attached to an enclosure panel and that is operated by a water pump powered by said battery pack, wherein said hose having a plurality of water jets that are optimally located to provide a water mist that impinges upon the surface of said air duct.

* * * * *